No. 680,834.  
F. BATHURST.  
HOUSE WIRING.  
(Application filed Oct. 30, 1899.)  
Patented Aug. 20, 1901.
(No Model.)
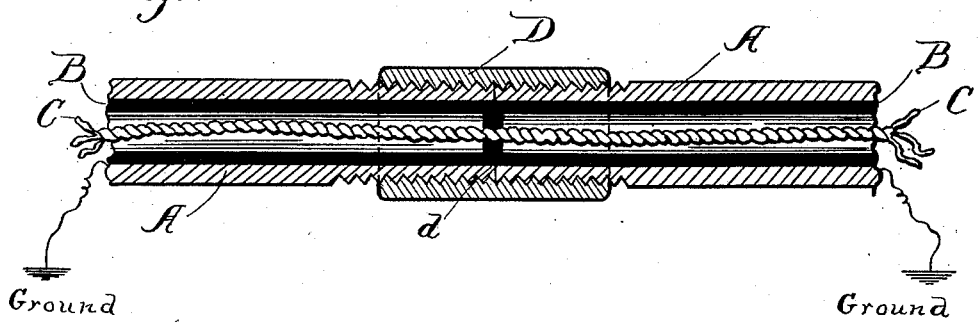
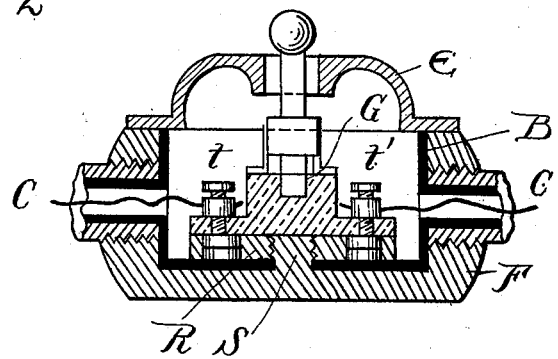
Witnesses  
George M. Richards.  
E. F. Babcock
Inventor  
Fred'k Bathurst  
by  
W. H. Babcock  
Attorney
THE NORRIS PETERS CO., PHOTO-LITHO., WASHINGTON, D. C.

UNITED STATES PATENT OFFICE.

FREDERICK BATHURST, OF SOUTHFIELDS, ENGLAND.

HOUSE-WIRING.

SPECIFICATION forming part of Letters Patent No. 680,834, dated August 20, 1901.

Application filed October 30, 1899. Serial No. 735,340. (No model.)

*To all whom it may concern:*

Be it known that I, FREDERICK BATHURST, a subject of Her Majesty the Queen of Great Britain, residing at Southfields, in the county of Surrey, England, have invented certain new and useful Improvements in House-Wiring, of which the following is a specification.

My invention has for its object the use of a bare wire or bare single-stranded conductor carried through an armored conduit or metallic tube, with a lining or sheath made of any insulating material of an elastic nature as an internal covering. The bare wire or bare stranded conductor in this case forms the positive (+) lead, and the metallic tube or armoring is "grounded" and forms the negative (−) or return-lead. This return-lead is, as aforesaid, grounded, so as to be normally in the condition of "ground potential." In the establishment of this system according to my invention it is necessary that all intermediate joint-boxes and junctions, fittings, and the like may correspond to the conditions of the grounded armored conduit carrying the bare lead. I attain these objects according to the devices illustrated by the appended drawings and which are referred to in the description.

Figure 1 is a sectional elevation of a grounded armored conduit internally insulated and carrying a bare conductor, showing a plain joint. Fig. 2 is a connection-box adapted to the same, shown in section, and carrying a tumbler-switch.

Similar letters refer to similar parts throughout the several views.

In carrying my invention into effect I employ a metal pipe or armored conduit A, Fig. 1, which is internally lined or coated with any resilient or elastic insulating lining or sheath B, which may be erected in buildings or the like as an installation in the same manner as ordinary gas or water pipes, with the necessary elbow, T, or socket joints screwed to fit together, and where an open joint is required for breaking the system between junction boxes or fittings I employ a running joint—that is to say, having the male screw-thread carried back sufficiently to clear the sleeves, with a back-nut or lock-nut to close and heremetically seal the joint when completed. It is essential in running an installation upon this system that a perfectly tight joint be made in each junction between lengths of conduit or when these are broken to admit of connection with junction-boxes and armored casings holding fittings. The perfect continuity of the metallic outer conduit A is essential and also the abutment of the interior insulating-lining B. This is effected naturally by the cutting of the conduit or pipe into lengths or at any required point of junction by ordinary pipe-cutters, which causes the resilient sheath to protrude slightly when the metal is cut. The operation of cutting a screw-thread on the ends increases this, so that when a joint is made the insulating-lining makes a butt-joint, as $d$, Fig. 1, when the sleeve D is screwed home. In order to procure a perfect water-tight joint, I may paint the ends of the pipes with any suitable insulating-varnish to assist the junction of the insulating-sheathing when in position of abutment. No washers need be employed to effect the junction of the insulating-sheath B. As a matter of fact, the whole of the conduit may be run as a gas or water pipe under the conditions hereinbefore described. The continuity test is carried out by means of a "fishing-wire," which is a wire or spiral tape having a weighted end, which being pushed through the bore of B is blocked by any break or obstacle in the continuity thereof, and the position of the same may be exactly located. Said fishing-wire is always operated by means of a combined rotary and forward movement and serves to guide the bare conductor C through the system of insulated pipes. When said bare conductor C is established, the ordinary tests may be made to determine the relative resistances of the inner bare conductor C and the grounded outer pipe or conduit A, and the hermeticity thereof may be tested as a whole or in sections by an ordinary air-pump or like device having a suitable gage or indicator to show any degree of leakage.

All outlets for ceiling-roses, wall-plugs, switches, fuses, and the like are connected up in the same manner to metal boxes with screwed inlets having an interior insulating-lining similar to and corresponding to the lining B of the conduit or pipe A, the insulating abutment or continuity being preserved.

In the insertion of a switch, which may be of any type, provided it has a porcelain or like insulating base, but here shown by Fig. 2 as a "tumbler-switch," I inclose it within a case of metal F, which has an insulating-lining B, corresponding to that of the conduit or pipe which is to be fitted thereto. A stud s, forming an integral part of the base F, is screwed to receive a supplementary base R, to which the actual base G of the switch is affixed by the countersunk screws of the terminals t t', and a cover E incloses the switch-gear. Here the bare conductor C passes from terminal t to t', and the circuit is established when the switch is closed, since the case F forms a part of the grounded metallic conduit A.

Having described my invention, what I claim, and desire to secure by Letters Patent of the United States of America, is as follows:

1. In wiring electrical installations the combination of a grounded metallic pipe with screwed or like fittings and an insulating-sheath fitting it interiorly, with a bare single or stranded conductor forming one part of the circuit, and the grounded armored conduit or pipe forming the other part thereof as described and shown.

2. The combination of a grounded metallic pipe with an interior insulating-sheath, a conductor within the said sheath, coupling devices for the said pipe, a case connected to the said pipe, an insulating-lining for the interior of the said case and terminals for the said conductor within the said case, the said pipe constituting one part of the electric circuit and the said conductor constituting another part of the same substantially as set forth.

FREDERICK BATHURST.

Witnesses:
EDMUND S. SNEWIN,
WM. O. BROWN.